Feb. 2, 1960   R. B. BRINDLEY ET AL   2,923,166
PULLEY CONSTRUCTION
Filed March 5, 1956   3 Sheets-Sheet 1
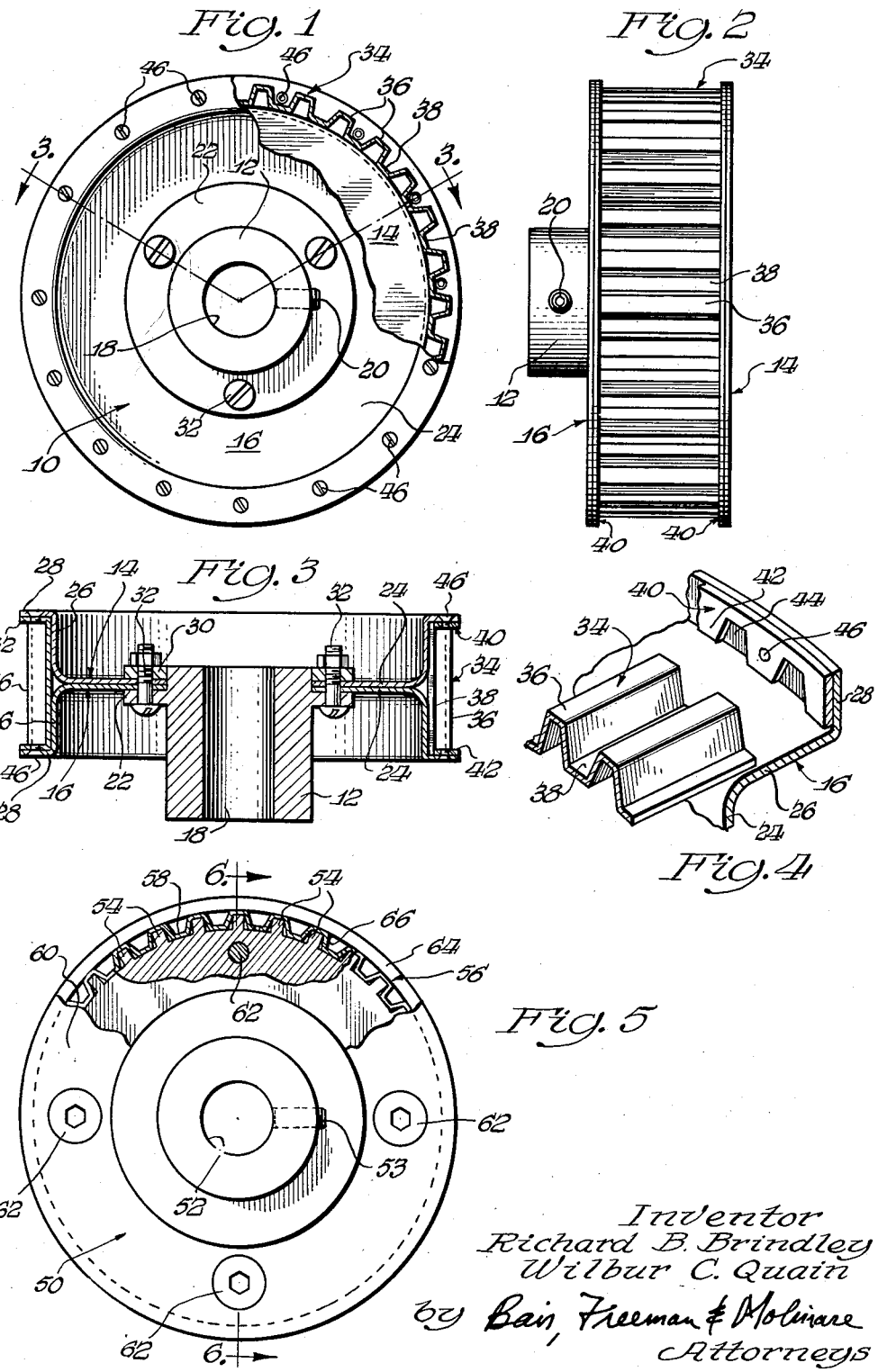
Inventor
Richard B. Brindley
Wilbur C. Quain
by Bair, Freeman & Molinare
Attorneys Feb. 2, 1960
R. B. BRINDLEY ET AL
2,923,166
PULLEY CONSTRUCTION
Filed March 5, 1956
3 Sheets-Sheet 2
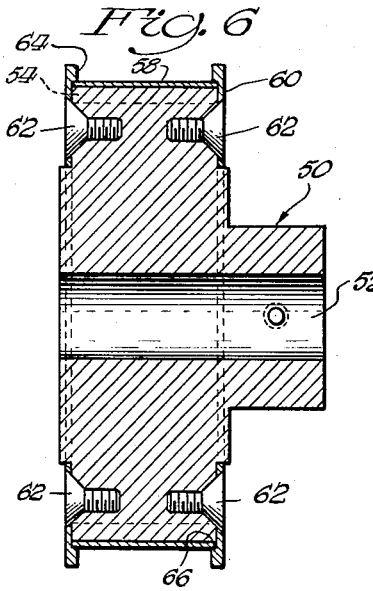
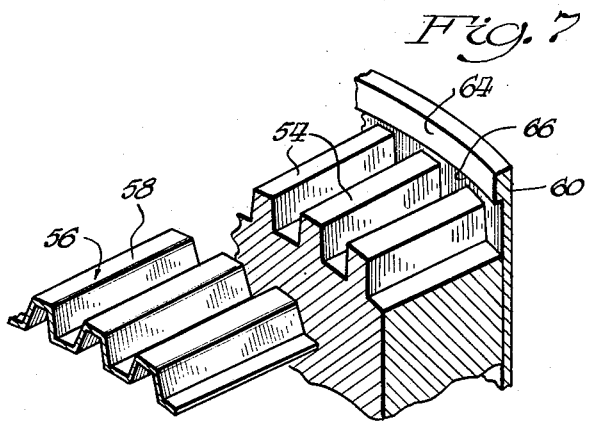
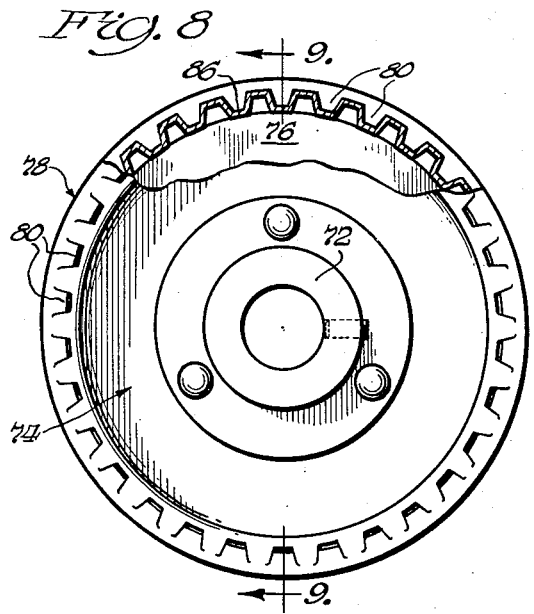
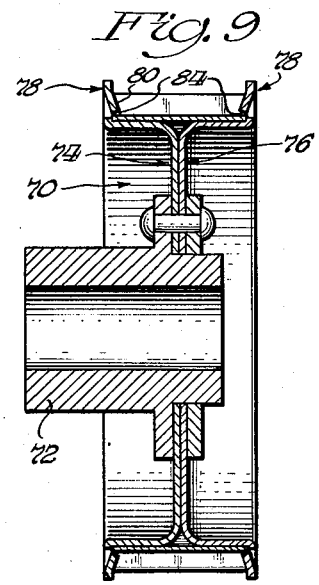
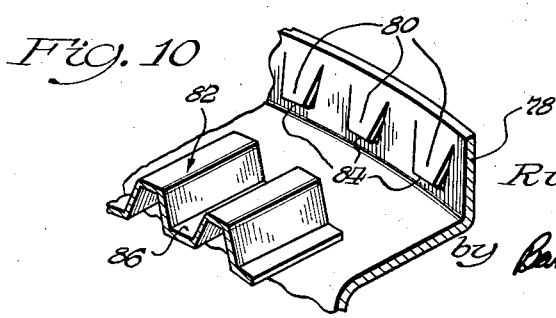
Inventor
Richard B. Brindley
Wilbur C. Quain
by Bair, Freeman & Molinare
Attorneys Feb. 2, 1960 R. B. BRINDLEY ET AL 2,923,166
PULLEY CONSTRUCTION
Filed March 5, 1956 3 Sheets-Sheet 3

Inventors
Richard B. Brindley
Wilbur C. Quain
by Bair, Freeman & Molinare
Attorneys

United States Patent Office 2,923,166
Patented Feb. 2, 1960

2,923,166

PULLEY CONSTRUCTION

Richard B. Brindley and Wilbur C. Quain, La Crosse, Wis., assignors to Richard B. Brindley, trustee Application March 5, 1956, Serial No. 569,472

7 Claims. (Cl. 74—230.5)

This invention relates to a pulley construction and more particularly to a sprocket-type pulley construction which is adapted for meshing engagement with a toothed endless member.

Sprocket-type pulley construction has, of course, been for years in environments which require meshing engagement of the sprocket wheel with an endless member. Such prior uses include meshing sprocket wheels, or sprockets having chains trained thereover, and other such typical installations.

Within recent years, there has been an important development in the type of toothed endless members which are adapted for meshing with sprocket wheels. This development consists of a pulley belt made of rubber or other resilient composition which is reinforced along the length of its neutral axis so as to limit stretching of the belt along its longitudinal, or neutral, axis, and said pulley belt has formed therein a plurality of alternately spaced teeth and recesses adapted for meshing with the peripheral teeth of a toothed pulley or sprocket. The advantages of this belt of resilient composition with preformed teeth is that the belt is very adaptable in installations which require positive drive without belt slippage, as in timing installations. While in some respects this belt of resilient composition is not necessarily superior to gears or chains, in other respects it is definitely superior, for example, in that it does not require lubrication and permits efficient operations at very high speeds. The belt is also useable in all ranges of power applications, from very small business machines, which require practically no power, to large machines which may deliver as high as 2000 horsepower.

Now the composition of material in the aforesaid belts is such as to abrade or wear out pulley wheels having belt-meshing teeth of zinc, aluminum, cast iron, or steel. Naturally, the rate of wear is inverse to the relative hardness of the material forming the belt meshing teeth. Accordingly, it would be most desirable to use material for pulley teeth which would be most resistant to wear. However, as pulleys and sprockets are now constructed it would require making the entire pulley or sprocket of the same material, and since abrasion resistant material is relatively more expensive, a pulley made wholly from abrasion resistant material would be very costly. Furthermore, every material wears to some degree and even an expensive pulley would wear after sufficient use so as to make it unuseable, and the cost of replacement would be substantial.

It is accordingly one object of this invention to provide a novel pulley construction wherein the meshing surface thereof, which is the surface subject to wear, is renewable, so that after wear has taken place in the meshing surface of the pulley, said meshing surface may be renewed without having to discard the remainder of the pulley which has not been subjected to wear.

Another object of this invention is to provide a pulley construction wherein the portion thereof which is subject to wear may be made of wear resistant material without materially increasing the cost of such pulley construction.

A further object of this invention is to provide a toothed pulley construction which is very simple to make and does not require an expensive tooth hobbing or cutting operation as is normally required in forming toothed pulleys.

Still another object is to provide a pulley construction having a preformed toothed peripheral sheet metal liner thereon for forming a toothed pulley construction.

And a further object of this invention is to provide a pulley having a renewable tooth construction thereof.

Still a further object of this invention is to provide a toothed pulley construction that is characterized by its simplicity and inexpensiveness of construction and by its long useful life and ruggedness.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 1 is a side elevation view, with parts broken away, of a pulley embodying the invention;

Figure 2 is an edge elevation view of the pulley of Figure 1 and is taken looking from the right of Figure 1;

Figure 3 is a cross-section view taken on line 3—3 of Figure 1;

Figure 4 is an enlarged fragmentary perspective view showing the details of cooperation between the pulley-teeth liner and the means for retaining the liner on the pulley hub as employed in the form of invention of Figures 1–3;

Figure 5 is a side elevation view, with parts broken away, of a modified form of pulley construction according to this invention;

Figure 6 is a cross-section view taken on line 6—6 of Figure 5;

Figure 7 is a view similar to Figure 4 but showing the details of construction of the modified form of construction of Figures 5 and 6;

Figures 8, 9, 10 are similar to Figures 5, 6 and 7 but show still another modified form of pulley construction according to this invention;

Figure 11:
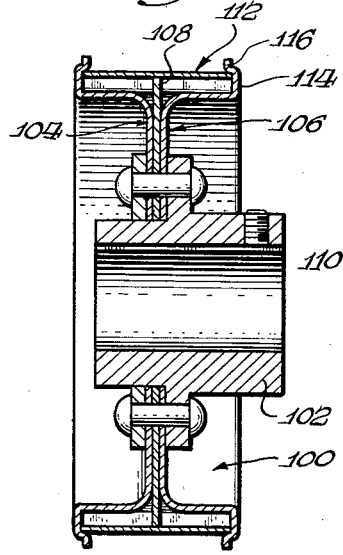
Figure 11 shows still another modified form of pulley construction according to this invention.
Figure 12:
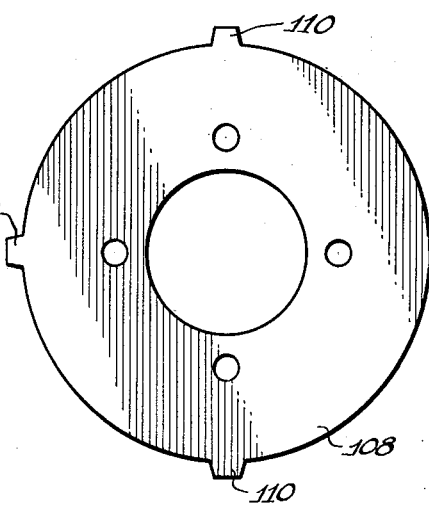
Figures 12 and 13 are elevation and end views, respectively, showing details of the center plate used in the modified form of invention of Figure 11.
Figure 13:
Figure 14:
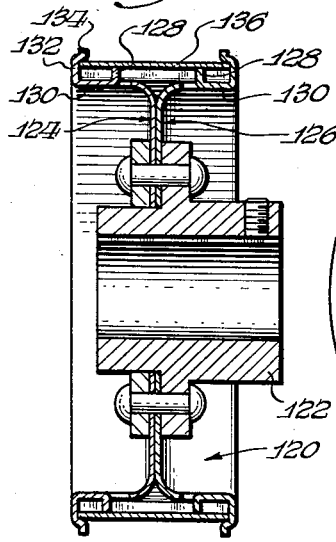
Figure 14 shows another modified form of pulley construction according to this invention.
Figure 15:
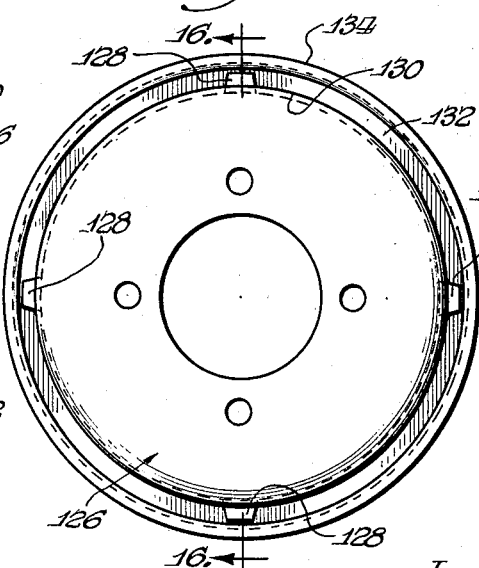
Figures 15 and 16 are elevation and end views, respectively, showing details of the hub members used in the modified form of invention of Figure 14.
Figure 16:
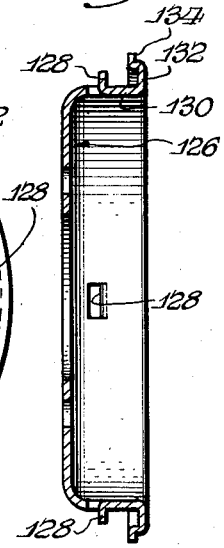

Referring now to the drawings, there are shown in said drawings a number of alternate forms of construction of a pulley embodying the features of this invention. One species is shown in Figures 1 to 4, a second species is shown in Figures 5 to 7, a third species is shown in Figures 8 to 10, a fourth species is shown in Figures 11 to 13, and a fifth species is shown in Figures 14 to 16.

In the species of Figures 1 to 4 there is provided means defining a hub construction generally indicated at 10. The hub construction includes a central casting, or machined portion 12, and a pair of similar sheet metal stampings 14 and 16. The central casting 12 is provided with a bore 18 therethrough, for fitting the hub onto a shaft. The casting 12 also carries a set screw 20 for securement thereof to the shaft upon which the hub is fitted. The central casting 12 is formed to define an outwardly extending flange 22. The remainder of the pulley hub is formed by the pair of dished stampings 14 and 16.

The stampings 14 and 16 are similar but are arranged in opposite facing relation with respect to each other. Each of the stampings 14 and 16 includes a web portion 24, a cylindrical wall portion 26, and a circumferential flange portion 28. When the web portions 24 of the stampings 14 and 16 are placed in abutting relation, as shown in Figure 3, said web portions 24 cooperate with the hub 12 to serve as a portion of the web of the hub; the cylindrical wall portions 26 cooperate to define the peripheral cylindrical face of the pulley; and the circumferential flanges 28 are spaced from each other, as shown, and are located at the edges of the peripheral, or operative, face of the pulley.

The hub is completed by means of a washer 30 and a plurality of connectors, which may be rivets, or nut and bolt connections 32 which are operative to clamp together the washer 30, and web portions 24 of the stampings 14 and 16, and flange 22 of the hub 12, in a rigid connection.

Thus far, the hub of the pulley construction as disclosed has a substantially smooth peripheral face thereof defined by the cylindrical wall portions 26 of the stampings 14 and 16. In order to form the toothed periphery of the pulley, there is provided an elongated strip, or preformed band, of sheet metal, which has been preformed in any desired manner so as to define a plurality of alternate ridges, or teeth, and valleys, or recesses, between successive teeth. In a way, this preformed strip appears as a corrugated strip, with the corrugations thereof preformed to a particular shape. The preformed strip is made of a particular length and provides a predetermined number of spaced teeth for use with a pulley of a particular circumference, and the preformed strip is then wrapped around the peripheral, or operative, face of the pulley so as to define upon the hub portion of the pulley an endless toothed periphery having a predetermined number of alternate ridges and valleys. The terminal ends of the strip which is wrapped around the peripheral face of the pulley hub may be joined together in any appropriate manner, such as by brazing or welding, and by polishing the joint of connection thus formed, so as to eliminate any protuberance or undesirable ridges that may be formed by the joining of the terminal ends of the strip.

As shown in Figures 1 to 4, the preformed band, or strip, is designated generally at 34, and the ridges formed thereby are designated 36 and the depressions, valleys, or recesses, are designated 38. The preformed band 34 is preferably formed of a very wear resistant material, or abrasion resistant material, such as stainless steel or the like, since the toothed periphery of the pulley is the only portion of the pulley that is really subject to wear.

In addition to the hub construction and preformed periphery thus defined, means are provided for retaining said preformed periphery on said hub. Now in order to retain this preformed band 34 on the periphery of the hub, there are provided means for overlying the lateral edges of portions of the preformed strip 34 to resist outward movement of the strip relative to the hub upon which the strip is positioned. Furthermore, it is desirable to maintain the spacing of the ridges, or teeth, 36, relative to each other. Toward those ends, the species of Figures 1 to 4 is provided with at least one, and preferably a pair of, stamped annular retaining rings 40 which are formed to define spaced inwardly extending teeth 42 and alternating recesses 44. The annular retaining rings 40 are so arranged relative to the preformed strip 34 that the teeth 42 enter the depressions 38 of the strip 34, and the recesses 44 in ring 40 accommodate and receive the ridges, or teeth, 36, of the band 34. The alternate teeth 42 and recesses 44 on ring 40 cooperate with the alternate depressions 38 and teeth 36 on the band 34 to provide an interlocking relationship which serves to maintain substantially uniform spacing between the teeth 36, and also serves to restrain the strip 34 from moving outwardly, or radially, relative to the hub 10.

The stamped retaining rings 40 may be appropriately secured to the circumferential flanges 28 on the hub by any convenient means. As shown in Figure 4, the means of connection is by means of countersunk screws 46. Another means of connection would be through the medium of spot welding the ring 40 to the circumferential flanges 28.

When the screws 46 are used, and when the hub is assembled by means of nuts and bolts 32 rather than by rivets, then the entire assembly can be taken apart after considerable use of the pulley has caused the preformed strip to become worn, and the worn strip 34 can be replaced with a new strip and reassembled without discarding any other portion of the pulley assembly. It will be seen that in order to effect assembly of the device shown in Figure 3, the retainer rings 40 must be preassembled onto the corrugated strip 34 before the outermost stamping 14 is put into position, and the bolts 32 are then connected to assemble the hub. After such assembly takes place, then the retaining ring 40 which attaches to the stamping 14 may be secured thereto to complete the assembly of the entire structure shown.

While the retaining ring 40 as shown provides a tooth 42 for each depression 38 in the corrugated strip 34, it will be appreciated that lesser numbers of teeth 42 may be used if there is less load to be carried by the pulley. Sufficient numbers of teeth 42 should be utilized to insure that substantially uniform spacing between successive teeth 36 of the corrugated strip is maintained. Also sufficient engagement between portions of the retaining ring 40 and portions of the corrugated strip 34 should be obtained to insure full retention of the corrugated strip 34 on the pulley hub to obviate radial movement of the corrugated strip 34 relative to the hub 10.

In the form of the device shown in Figures 5 to 7, there is provided a hub means generally indicated at 50 that is provided with a central bore 52 for fitting onto a shaft for carrying the hub. The hub 50 also carries a set screw 53 for engagement with the shaft upon which the hub is mounted. Hub 50 is primarily a casting that has been machined to provide a plurality of spaced ribs, or teeth, 54 in the peripheral, or operative, face of the hub. The spaced teeth need not be too accurately formed to define the exact form of tooth desired for cooperation with another toothed member, as the teeth 54 merely serve as positioning means, or devices, for cooperating with the preformed corrugated strip 56 that is wrapped around the periphery of the hub in the manner as disclosed heretofore. However, the ribs 54 are accurately spaced on the periphery of the hub and thus serve as an excellent means for positioning the teeth 58 which are formed in the preformed strip 56, so as to provide for substantially accurate uniform spacing of the operative teeth 58 of the pulley. When strip 56 is wrapped around the periphery of hub 50, the teeth 58 of strip 56 fit over the ribs 54. As can best be seen in Figure 5, the teeth 54 formed integrally on the hub may also serve to engage portions of the underside of strip 56 so as to provide a bearing support for the uppermost portions of the teeth 58 formed in the continuous strip 56.

Once again, in the form of invention shown in Figures 5 to 7, means must be provided for overlying the continuous corrugated strip 56, which defines the operative teeth and operative face of the pulley, to prevent outward movement of the strip 56 relative to the hub 50. To provide such restraint, there is provided at least one, and preferably two, annular retaining plates 60 which are adapted to be secured to the lateral faces of the hub 50 by means of screws 62. These annular plates 60 are formed with enlarged circumferential portions 64 which are located radially outwardly of the toothed strip 56 and extend inwardly relative to the lateral faces of the hub 50, and overlie the corrugated or preformed strip 56 which is positioned on the working face of the pulley. The plates 60 are so dimensioned that the inner circumferential edge 66 of the overhanging circumferential portion 64 is adapted to engage the uppermost portions of the ridges or teeth 58 of strip 56, and thus serves to exercise a restraint against outward movement of the strip 56 relative to the hub 50.

In the form of the invention shown in Figures 8 to 10, once again there is a hub means 70, which includes a central hub portion 72 similar to central hub 12 in Figures 1 to 3. Again, the remainder of the hub is formed by a pair of stampings 74 and 76 located back to back as in Figures 1 to 3. However, whereas in the device of Figures 1 to 4 the means for restraint and engagement between the hub and the preformed toothed strip is obtained by means of the stamped preformed plate 40, in the instant modification, the outwardly extending circumferential flanges 78 of the stampings 74 and 76 are formed with a plurality of tabs 80 which are adapted to be struck inwardly after a corrugated, or preformed strip, 82 has been positioned on the peripheral face of the hub. These tabs 80 are preferably shaped in the form of teeth, as shown, and are adapted to enter into the recesses defined between successive teeth of the preformed strip 82. The lower edges 84 of the tabs 80 are adapted to engage, or lie closely above, the depressed portions 86 formed in the preformed strip 82, and thus are adapted to engage the preformed strip 82 so as to limit radial movement of the preformed strip 82 relative to the hub of the pulley. Once again, the tabs 80 may be formed in only one, but preferably in both, of the flanges 78 formed on the hub 70. The tabs 80 are preferably precut when the stampings 74 and 76 are formed, so that the tabs 80 are prelocated and presized to cooperate with a strip 82 of known dimension, so that assembly may be easily effected.

In the form of the invention shown in Figure 11, there is again shown a hub means generally indicated at 100, and comprising a central hub portion 102 and a pair of preformed stampings 104 and 106. However, instead of the preformed stampings 104 and 106 being located in back to back relation, as in Figures 3 and 9, there is interposed, between the webs of the stampings 104 and 106, a locating, or locking, plate 108. The locking plate 108 is an annular member which is a stamping, and is arranged for easy assembly with the other parts of the hub. The periphery of the locking plate 108 is formed with a plurality of outwardly extending tabs, or flanges, 110 which serve as ribs and are adapted to enter the underside of certain of the teeth formed in a preformed strip having alternate teeth and depressions, so as to provide means for maintaining substantial uniform spacing between the ridges, or teeth, on the preformed strip 112. While plate 108 is shown with only four such outwardly extending tabs 110, it will be readily appreciated that more of such tabs may be provided as required or desired. The plate 108 is located substantially equidistant inwardly from the edges of the toothed strip 112.

In addition to the foregoing feature, the preformed stampings 104 and 106 are each formed with an outwardly extending circumferential edge flange 114, which carries at the extended end thereof an inwardly offset, circumferential retaining flange 116. The inwardly offset flange 116 is arranged to overlie edge portions of the preformed strip 112 which is mounted on the cylindrical, or operative, face of the pulley. Said inwardly offset flanges 116 cooperate to engage portions of strip 112 so as to limit the radial movement of said preformed strip 112 outwardly relative to the hub of the pulley.

In the fifth modification shown in Figure 14, again there is shown a pulley having a hub means 120 comprising a central hub portion 122, and a pair of preformed stampings 124 and 126. In this form of the invention the stampings 124 and 126 are again arranged back to back, as in Figures 3 and 9, with the webs of stampings 124 and 126 serving as the web of hub means 120. A variation in this modification over that disclosed in Figure 11 is that instead of using the central locking, or positioning plate 108, there is formed in each of the stampings 124 and 126 a plurality of outwardly extending tabs, or flanges, 128 which serve as ribs or rib means and which are bent from cylindrical wall portions 130 formed in each of the stampings. The tabs 128 may be formed by any convenient stamping operation and said tabs 128 are located equidistant inwardly from circumferential edge flanges 132 that are formed on each of the stampings 124 and 126. Each of the stampings 124 and 126 is formed with an inwardly offset, circumferential shoulder or retaining flange 134, for overlying the lateral edges of a preformed strip 136 which is wrapped around the cylindrical periphery of the hub means 120. Although only four tabs 128 are shown formed on each of stampings 124 and 126, it will be appreciated that more of such tabs 128 may be formed where required, or desired.

From the foregoing it will be seen that there is provided a new and improved pulley construction which may be equipped with a renewable toothed periphery therefor. Furthermore, a pulley constructed as disclosed herein has many advantages of ease of forming, reduced machining operations thereon, and simplicity of assembly and disassembly.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new, and desire to secure by Letters Patent of the United States, is:

1. A pulley construction comprising means defining a hub member, a preformed strip of sheet metal on the periphery of said hub defining a toothed hub periphery, means carried by said hub engaging the outer periphery of at least one edge of said preformed strip at the outermost radial extent of said preformed strip for retaining said preformed toothed periphery on said hub, and a plurality of radially extending spaced ribs on the periphery of said hub having at least portions thereof spaced axially inwardly of the edges of said preformed strip and having the teeth of said toothed strip fitted thereover and cooperating with said toothed strip to help maintain the spacing of the teeth of said toothed strip.

2. A pulley construction comprising means defining a hub member, a preformed strip of sheet metal on the periphery of said hub defining a toothed hub periphery, and means carried by said hub for retaining said preformed toothed periphery on said hub, said latter means comprising a plurality of radially extending spaced ribs on the periphery of said hub having at least portions thereof spaced axially inwardly of the edges of said preformed strip and having the teeth of said toothed strip fitted thereover and cooperating with said toothed strip to help maintain the spacing of the teeth of said toothed strip, and means on said hub located radially outwardly of the outermost radial extent of said toothed strip and adapted to engage portions of said toothed strip for restraining radial movement of said strip outwardly from said hub.

3. A pulley construction comprising means defining a hub member, a preformed strip of sheet metal on the periphery of said hub defining a toothed hub periphery, and means carried by said hub for retaining said preformed toothed sheet metal strip on said hub, said latter means comprising means on said hub located radially outwardly of the outermost radial extent of said toothed strip and adapted to engage portions of said toothed strip for restraining radial movement of said strip outwardly from said hub, and means on said hub located substantially equidistant inwardly from the edges of said toothed strip defining a plurality of circumferentially spaced outwardly extending ribs for fitting into recesses defined in the underside of said preformed strip for substantially maintaining the spacing between the teeth defined by said preformed strip.

4. A pulley construction comprising a hub, an elongated preformed band separate from said hub positioned around the periphery of said hub to define an endless, toothed periphery on said pulley, means carried by said hub and positioned radially outwardly of the outermost radial extent of said band and engaging portions of said band for restraining radial movement of said band outwardly from said hub, and radially extending spacing means carried by said hub and engaging portions of the inner periphery of said preformed band at points spaced inwardly of the edges of said preformed band for maintaining the tooth spacing on said band carried on the hub.

5. A pulley construction comprising a pair of similar dished members each having a bottom and a cylindrical side, said dished members being arranged in oppositely facing manner with their bottoms adjacent and with their cylindrical sides aligned, a plate disposed between the adjacent bottoms of said dished members and having a plurality of ribs extending therefrom outwardly of the aligned cylindrical sides of said dished members, means connecting said bottoms and plate together to define a pulley hub having a cylindrical side, a preformed toothed strip of sheet metal wrapped around the cylindrical side of said hub to define an endless toothed pulley periphery, and said ribs cooperating with said preformed strip to help maintain the spacing of the teeth of the toothed strip.

6. A pulley construction comprising a pair of similar dished members each having a bottom and a cylindrical side, said dished members being arranged in oppositely facing manner with their bottoms adjacent and with their cylindrical sides aligned, a plate disposed between the adjacent bottoms of said dished members and having a plurality of ribs extending therefrom outwardly of the aligned cylindrical sides of said dished members, means connecting said bottoms and plate together to define a pulley hub having a cylindrical side, a preformed toothed strip of sheet metal wrapped around the cylindrical side of said hub to define an endless toothed pulley periphery, said ribs cooperating with said preformed strip to help maintain the spacing of the teeth of the toothed strip, and means on said pulley hub engaging portions of the outer periphery of said preformed toothed strip for restraining movement of said strip outwardly from said hub.

7. A pulley construction comprising a hub, an elongated preformed band of sheet material separate from said hub positioned around the periphery of said hub to define an endless, toothed periphery on said pulley, means carried by said hub for restraining radial movement of said band outwardly from said hub, spacing means carried by said hub and engaging portions of the inner periphery of said preformed band of sheet material for maintaining the tooth spacing on said band carried on the hub, and said hub being formed of at least two parts which are axially separable to permit of selective removal and assembly of preformed bands on the periphery of the hub without distortion of the said means for restraining radial movement or of the said spacing means.

References Cited in the file of this patent

UNITED STATES PATENTS

| | | |
|---|---|---|
| 334,998 | Wardwell | Jan. 26, 1886 |
| 951,503 | Johnston | Mar. 8, 1910 |
| 1,346,511 | Rogers | July 13, 1920 |
| 1,394,127 | Stone | Oct. 18, 1921 |
| 2,729,110 | Killian et al. | Jan. 3, 1956 |

FOREIGN PATENTS

| | | |
|---|---|---|
| 4,520 | Great Britain | of 1904 |
| 4,864 | Great Britain | of 1904 |
| 203,915 | Canada | Sept. 14, 1920 |
| 250,801 | Great Britain | Apr. 22, 1926 |
| 811,817 | Germany | Aug. 23, 1951 |